United States Patent [19]

Johnson

[11] Patent Number: 5,515,637
[45] Date of Patent: May 14, 1996

[54] BREEZE ANIMATED DECOYS

[76] Inventor: Walter I. Johnson, 2965 A S. 6th St., Milwaukee, Wis. 53207

[21] Appl. No.: 363,357

[22] Filed: Dec. 23, 1994

[51] Int. Cl.[6] ............................................. A01M 31/06
[52] U.S. Cl. .................................................. 43/2
[58] Field of Search ............................ 43/2, 3; 446/236, 446/176; 40/411, 412; 73/170.05

[56] References Cited

U.S. PATENT DOCUMENTS

| | | | |
|---|---|---|---|
| 261,910 | 8/1882 | Cochel | 43/3 |
| 278,461 | 5/1883 | Screven | 43/2 |
| 1,793,734 | 2/1931 | Cole | 43/2 X |
| 2,763,952 | 9/1956 | Bruce | 43/3 |
| 3,800,457 | 4/1974 | Barrett | 43/3 |
| 4,852,288 | 8/1989 | Payne et al. | 43/2 |
| 4,965,953 | 10/1990 | McKinney | 43/2 |
| 5,003,722 | 4/1991 | Berkley et al. | 43/3 |
| 5,274,942 | 1/1994 | Lanius | 43/2 |
| 5,279,063 | 1/1994 | Heiges | 43/3 |
| 5,289,654 | 3/1994 | Denny et al. | 43/2 |
| 5,392,554 | 2/1995 | Farstad et al. | 43/3 |

FOREIGN PATENT DOCUMENTS

| | | | |
|---|---|---|---|
| 389522 | 3/1933 | United Kingdom | 43/2 |
| 611844 | 11/1948 | United Kingdom | 43/2 |

*Primary Examiner*—Richard K. Seidel
*Assistant Examiner*—Jeanne M. Elpel
*Attorney, Agent, or Firm*—Nilles & Nilles

[57] ABSTRACT

A rod has a region at a selected place between its upper and lower ends formed into a helical spring in one embodiment. A part of the rod extends upwardly from the spring through a decoy body and a part of the rod below the spring is pushed into the ground to support the decoy. A spherical bead on the rod, even if the helical spring is not formed in the rod, serves as a thrust bearing allowing the decoy to swing about the vertical axis of the rod like a weather vane to simulate natural body and head lateral and frontal movements and to tilt when a mild breeze impinges on the body of the decoy.

16 Claims, 3 Drawing Sheets

BREEZE ANIMATED DECOYS

BACKGROUND OF THE INVENTION

The invention disclosed herein pertains to decoys such as are utilized by hunters, photographers, gardeners, yachtsmen, and naturalists to lure animals and fowl to a location where they are clearly in view, although sometimes decoys are used to scare away other creatures. The designers of many preexisting decoys have attempted to achieve similarity between the appearance of a live natural animal or fowl and the decoy. Some preexisting decoys are capable of being tilted or induced to bow and rise and rotate as if they are eating or keeping watch in all directions for intruders. Generally, a long string tied somewhere to the decoy is tugged and relaxed by a remotely situated person to animate the decoy. In some designs, electric motors in the decoy are energized in response to signals transmitted from a handheld radio transmitter.

Payne et al. U.S. Pat. No. 4,852,288 discloses a decoy resembling an animal where parts of the decoy's anatomy such as the neck, head, ears and tail are connected in a pivotable articulated manner to the main body so the body parts move in response to someone tugging on a string. The body parts are restored to a resting position as a result of being connected to the ends of rubber bands whose other ends are anchored to the body. The construction is complex and is expensive to manufacture. Moreover, its complexity and several moving parts increase the likelihood of a breakdown. Unless the string is tugged and relaxed, the decoy has little advantage over a completely rigid molded decoy body.

McKinney U.S. Pat. No. 4,965,953 discloses a fowl decoy whose body is pivotally connected to a stand and whose neck and body are connected together with a mechanism including tension strings. The mechanism is complex and must be installed in the body of the fowl by an assembler. A string tied to the mechanism is tugged and relaxed by a remotely positioned person who can easily become bored after a short period of pulling on the string. If pulling the string is discontinued, the decoy just stands there locking like any other single piece unanimated decoy.

Heiges U.S. Pat. No. 5,279,063 discloses a decoy simulating a fowl having a neck fastened at one end to a ball that is set in the decoy body for universal movement and at its other end fastened to a rotatably mounted head of the fowl. The neck is comprised of a long multiple turn tightly would helical spring with a plastic sheet around it. The construction is costly and complex. The head and neck must be manipulated relative to the body.

Lanius U.S. Pat. No. 5,274,942 has the head and neck of a fowl decoy pivotally connected to its body. A cord is attached to the head of the decoy and the cord has a weight fastened to it which tends to restore the neck of the decoy to an upright attitude from a downward attitude by having a string attached to the weight for a person situated remotely to tug on a string to cause the neck and head to bow. When the string tension is relieved a weight restores the neck and head to an upright attitude.

Denny U.S. Pat. No. 5,289,654 discloses a wild fowl decoy such as a turkey whose body contains electric motors that are operatively coupled to the head and neck, respectively, of the fowl. The motors are actuated by electric signals resulting from receiving radio signals from a remote transmitter.

The decoys just briefly described all have unnecessarily complex mechanisms for imparting motion to a decoy body or parts thereof. This complexity increases the likelihood of a breakdown in the mechanism driving the decoy and, of course, results in a high production cost and high purchase price. This is important to hunters, in particular, since they frequently like to use several decoys at a single site on the theory that crowds attract crowds. Thus, a simplified low cost decoy is highly desirable.

SUMMARY OF THE INVENTION

One objective achieved with the decoys disclosed herein is to provide self-animating decoys which have a minimum number of parts to make them affordable and, above all, reliable.

Another achieved objective of the invention is to provide decoys that are animated by exposure to a gentle breeze to thereby eliminate the need for a user to tug continuously on a string from a remote position to induce movement of the decoy.

How the foregoing objectives and other more specific objectives are achieved will be evident in the ensuing more detailed description of a preferred embodiment of the invention which will now be set forth in reference to the drawings.

DESCRIPTION OF A PREFERRED EMBODIMENT

Figure 1:
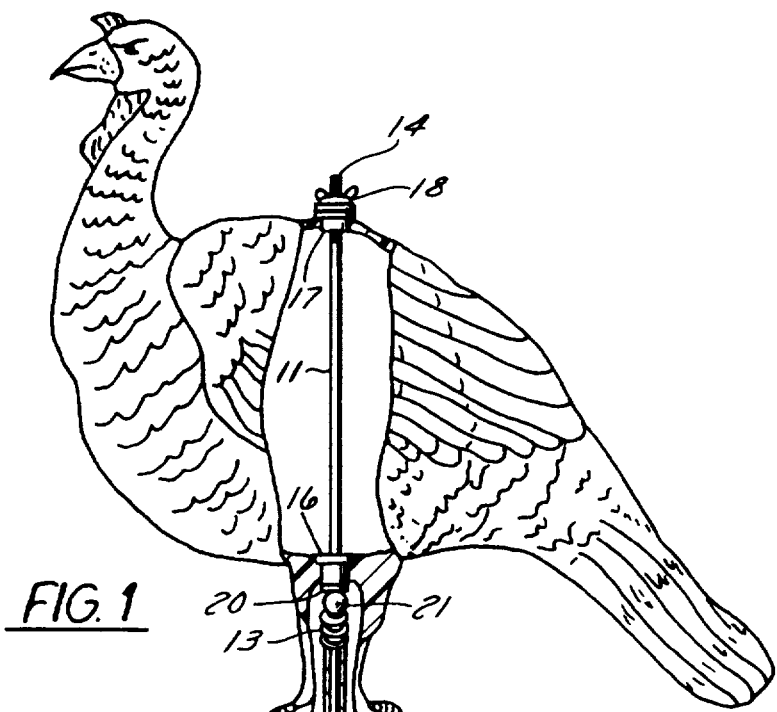
FIG. 1 is a side elevational view of a decoy resembling a wild turkey with part of its body broken away to exhibit the new animator mounting for enabling the decoy to bow and turn left and right in response to being exposed to a breeze.
Figure 2:
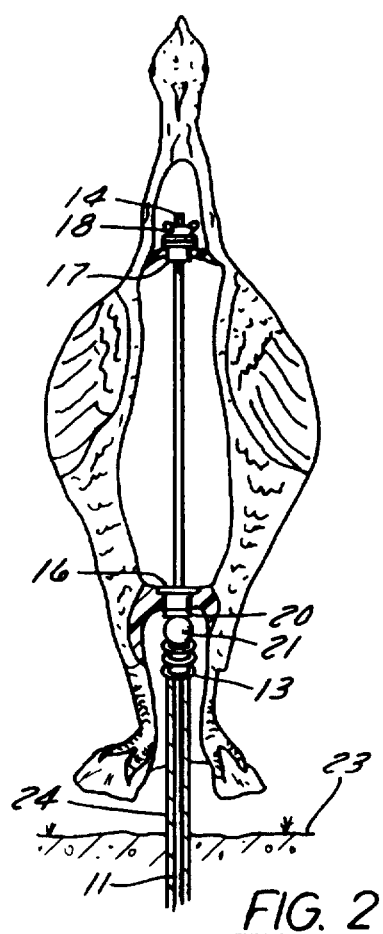
FIG. 2 is a front elevational view of the decoy of FIG. 1 with the breast region of the turkey broken away.

In FIGS. 1 and 2, a turkey decoy is used to illustrate the structure and function of the new rod and spring decoy mounting unit which allows the turkey to bow and turn from side to side in response to a light breeze as if it were eating or meandering. It should be understood at the outset that the rod and spring mounting unit is not restricted to use with turkey decoys but can be utilized to mount any animal, bird, fowl or other creature decoy a person might want to lure into a viewable position or scare away.

The turkey decoy body in FIGS. 1 and 2 comprise a blow molded shell of plastic material which is preferably painted to simulate the colored areas of a real live turkey. The new mounting unit is comprised of a flexible elongated rod 11 that has a springy characteristic. The unit is depicted by itself in FIG. 3. The rod, for example, can be composed of spring metal such as steel or bronze, a solid bendable plastic material, graphite, or fiberglass and resin such as is used for the shaft of fishing fly rods. Rod 11 has a helical spring 13 formed in it between its upper and lower ends 14 and 15. The helical spring and rod are integral and formed in one piece, although it is within the purview of the invention to have extension rods or tubes that extend over coaxial oppositely directed stub ends of the helical spring 13. The bottom or belly area of the turkey body in FIGS. 1 and 2 has a reinforcement bushing 16 in which there is a bore through which the rod 11 extends. The busing can be molded in the turkey body. Rod 11 passes through the entire body cavity of the turkey decoy and also through a bore in a reinforcement bushing 17 molded or set in the top or back of the turkey. The decoy may be retained on rod 11 by having the upper end of the rod threaded to provide for turning a nut, such as a wing nut 18, onto the thread. Those skilled in the art will appreciate that there are a wide variety of fastening means that can be used in place of a wing nut, but a nut can be unscrewed to enable withdrawing the rod 11 from the body of the decoy. The wing nut 18 must not be tightened intensely on the turkey for it is important that the turkey be able to rotate about the vertical axis of the rod 11. On some occasions, such as on very windy days, a little frictional drag imposed on rotation of the decoy may be achieved by turning the wing nut to develop the frictional force.

As shown in FIGS. 1 and 2, the relatively low weight of the shell-like decoy is borne by the lower bushing 16 which bears on a washer or washers 20 that are composed preferably of a low friction plastic material such as nylon. A bead or sphere 21 composed of plastic or wood is bored for fitting onto the straight portion of rod 11 above spring 13 where the straight portion joins the upper top convolution of helical spring 13. Use of the sphere 21 as a thrust bearing has been found to be more economical and simpler to install and effective than other conventional ball or roller bearings.

Usually, the decoy can be anchored in the desired location by simply pushing the lower end of rod 11, below spring 13, into the ground 23. When the ground is soft or soggy so as to be unable to support the decoy in a stable manner, a pipe 24 is first driven rather deeply into ground 23 and the lower end of rod 11 is inserted into the pipe until it stops against the lowermost convolution of spring 13. In either case, some clearance should be left between the feet of the decoy and ground 23 so the decoy can tilt, bow and turn freely on the rod. It is important to be aware that when a turkey or any other decoy is supported on the rod and spring mounting unit described above, rod 11 should pass through the body along a line that intersects the center of gravity of the body. This assures that the decoy will not settle rotationally into a position that would unbalance it and increase the amount of wind force that would be needed to cause it to rotate on the rod. When mounted properly as herein described, the body of the decoy rocks, tilts, bows and turns exclusively in response to a gentle breeze with no strings attached.

Figure 3:
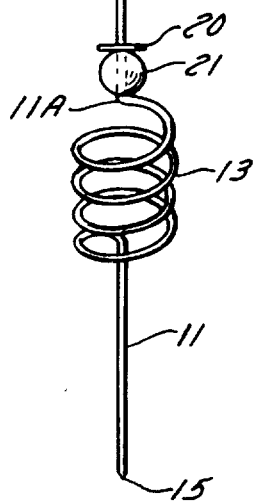
FIG. 3 is a side elevational view of a spring and rod animator unit for mounting a decoy over the ground with sufficient clearance to allow the decoy to bow and turn as if it were eating food, for example.

FIG. 3 shows the rod and spring mounting unit isolated from a decoy. The straight rod sections 11 above and below helical spring 13 are aligned or coaxial. The sharp bend in the rod and spring junction marked 11A assures that the thrust bearing sphere 21 will stay on a straight part of the rod 11. In an actual turkey decoy the bearing sphere 21 is a commercially available inexpensive wooden bead, although a bead composed of other materials could be used. The spring 13 in FIG. 3 is formed nearer to the lower end 15 of the rod than to the upper end 14. However, it should be understood that where appropriate, considering the size and type of decoy in which the rod-spring unit is used, the spring could be at other positions along the rod. Moreover, it is held in view that in some designs more than one spring might be formed in a continuous rod. In a design wherein a rod is composed of spring steel, the diameter of the rod used for a rather massive decoy such as a turkey is 3/16 inch (4.7 mm) in diameter.

Figure 4:
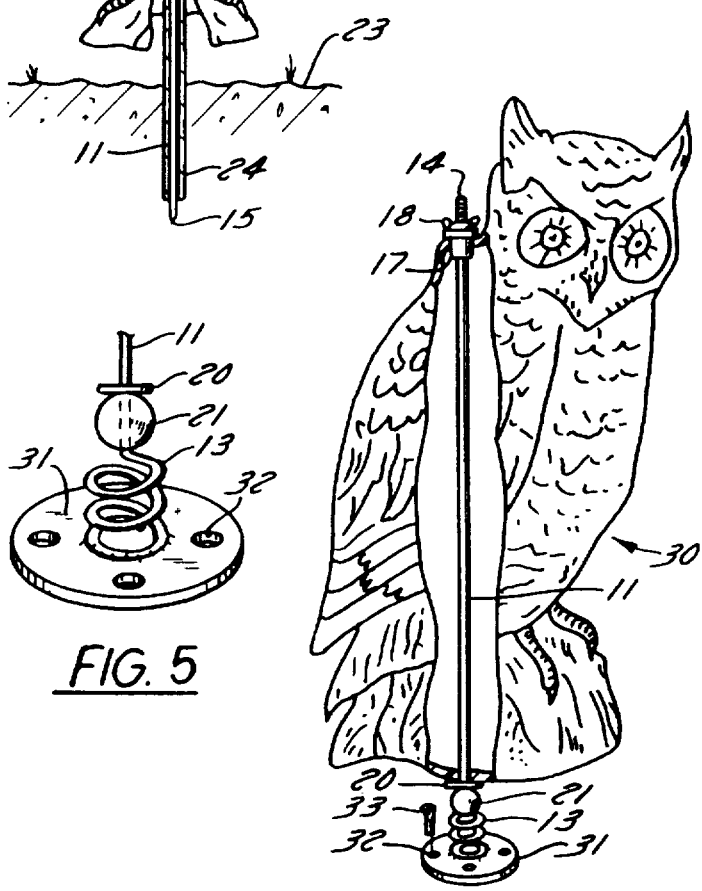
FIG. 4 is a front elevational view of a decoy resembling an owl with part of its body broken away to exhibit the new mounting on which the decoy is supported for bowing and turning in accordance with the invention.

FIG. 4 shows a decoy that simulates an owl mounted on the new spring rod unit for tilting and turning in accordance with the invention. Stationary simulated owls have been used to scare away undesirable birds or animals, such as rabbits, chipmunks, and rodents. Birds and animals apparently recognize in due course that the motionless owl is not alive so they disregard it. The new rod and spring unit mounting for a decoy in accordance with the invention animates the owl and any other decoy so it exhibits natural turning and tilting motions to thereby overcome the disadvantage of having a stationary single piece molded owl perform as a decoy.

In FIG. 4, parts that are the same as those used in connection with describing the FIGS. 1 and 2 embodiments are given the same reference numerals. Thus, a springy rod 11 extends vertically through the owl body and passes through the center of gravity. Washer or disk 20 bears on the thrust bearing sphere 21. Spring 13, formed at the extreme lower end of rod 11 is axially short and its lowermost convolution is fastened to a mounting or anchoring plate 31. The spring is fastened by welding to plate 31, but it could be fastened by other means. Plate 31 has holes 32 for fastening it to a board or the like, not shown, with screws 33 so the owl can stand on a roof or the ground, for example.

The owl decoy 30 can be retained on rod 11 by any element that allows the owl to turn on the rod and to bow and tilt as has been explained in reference to the turkey decoy. A light breeze and even a puff of breath is sufficient to make the decoy tilt or turn a little in opposition to the force of the spring 13 which tends to hold the owl in an erect position.

Figure 5:
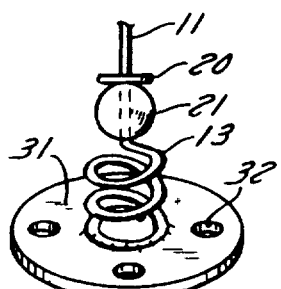
FIGS. 5, 6 and 7 show various clamping devices for establishing the owl decoy or other animal or fowl decoys in a fixed position such as on a flat base or a fence component or on a the branch of a tree.

FIG. 5 shows the mounting plate 31 isolated from the owl in FIG. 4 to enable a more detailed inspection of the spring-rod mounting unit.

Figure 6:
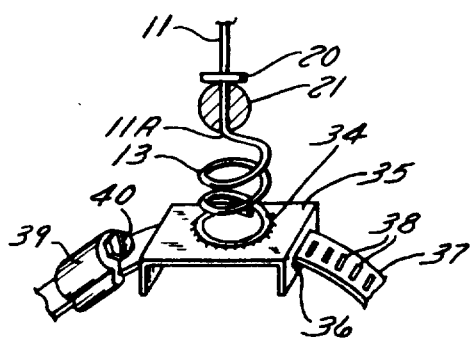
Figure 7:
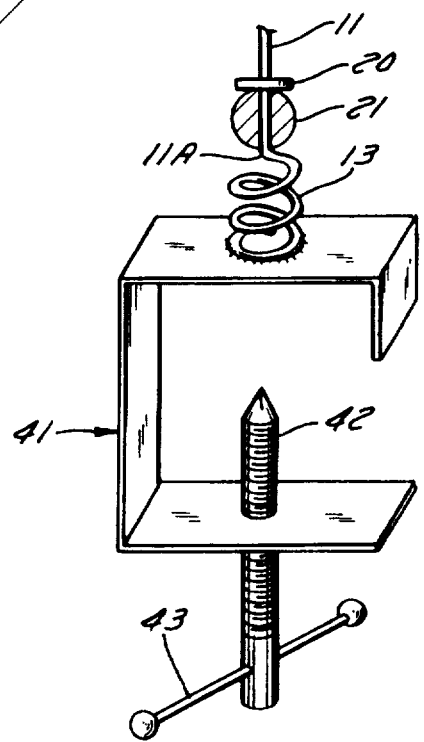

FIGS. 6 and 7 illustrate some hardware for mounting or anchoring decoys such as the owl off the ground. In FIG. 6 the rod 11 is shown broken away but extending from the uppermost convolution of helical spring 13. A weld 34 holds the lowermost convolution of spring 13 to a rigid plate 35. The depending ends of plate 35 have aligned rectangular holes 36 through which a metal band 37 extends. The band has slits 38 and the opposite ends of the band overlap after having passed through a tunnel element 39 in which there is a screw 40 that bites into slits 38 to tighten the band. This type of band clamp is available from hardware stores.

In FIG. 7, the mounting for a decoy comprises a C-clamp body 41 having a screw 42 threaded into it. The screw 42 has a handle 43 for turning it so it digs into a wooden member, such as a fence rail, not shown. As in the preceding FIGURE, the spring 13 is welded to body 41 although the spring could be joined to the body by other means.

Figure 8:
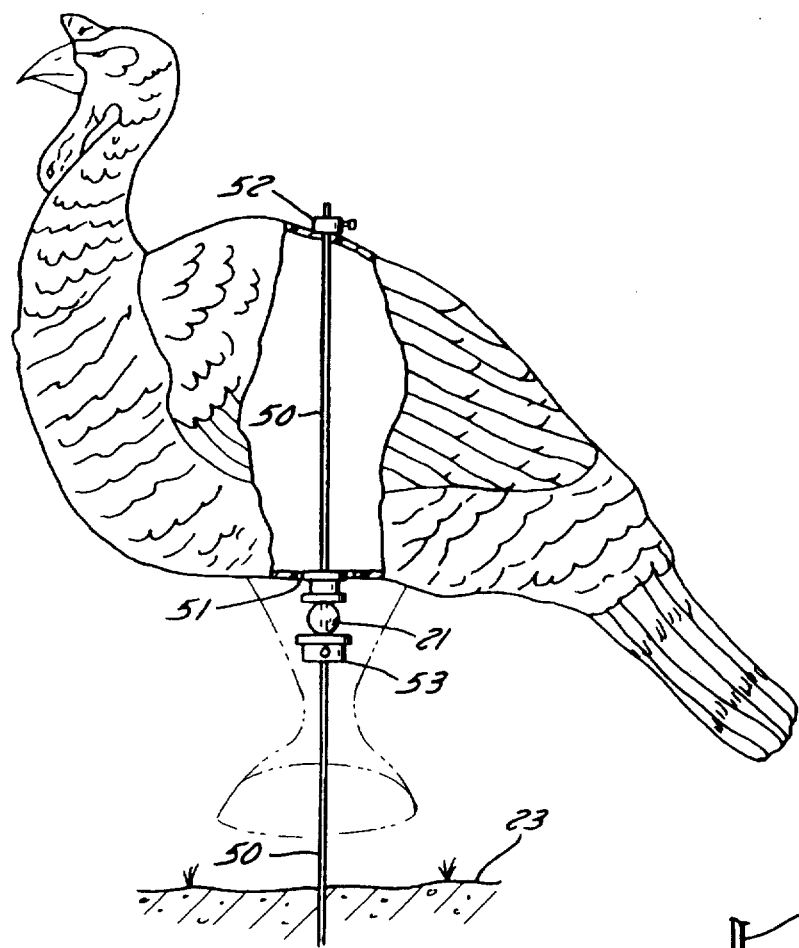
FIG. 8 is a side elevational view of a decoy resembling a wild turkey having a part of its body broken away to exhibit a springy bendable and self-restoring rod on which the decoy is mounted to allow it to bow and turn in response to being exposed to a mild breeze, consistent with the basic concept of the invention.

FIG. 8 illustrates another way in which the basic principles of mounting a decoy, in accordance with the invention, can be implemented. This embodiment, like the others, allows the decoy to rotate and tilt back and forth under the force of a breeze. Here, the turkey simulating decoy has a spring steel rod 50 running through its body and passing through the center of gravity of the turkey. The helical spring has been omitted. The rod 50 passes through a bore 51 in the turkey's belly which is at about the starting point of the bendable region of the rod. The decoy is retained at the desired elevation on the rod between an upper collar 52 and a lower collar 53. An anti-friction washer is interposed between the turkey shell and the bearing sphere 21 which is supported on collar 53. Rod 50 may be made of a number of springy materials including fiberglass, fiber reinforced graphite, spring bronze or spring steel.

Figure 9:
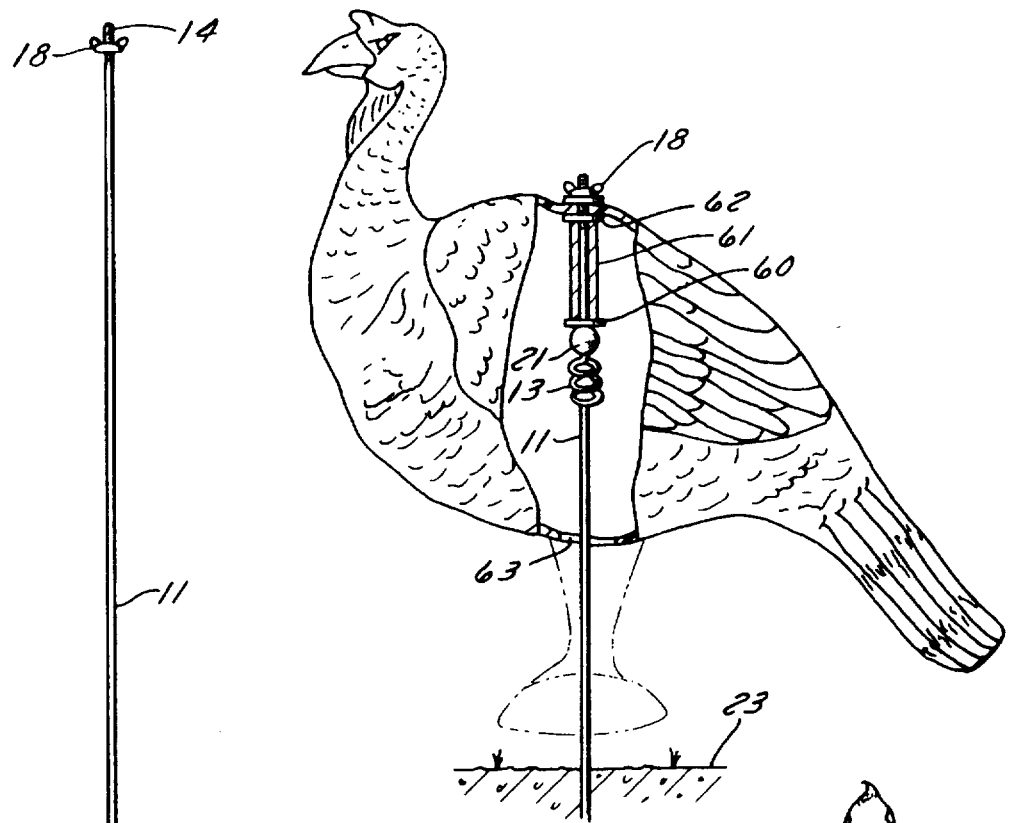
FIG. 9 is a side elevational view of a turkey supported on a modified embodiment of a spring support.
Figure 10:
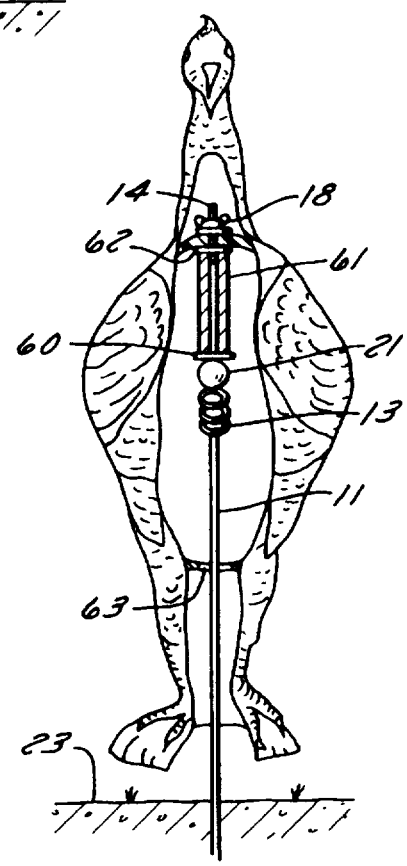
FIG. 10 is a front elevational view of the decoy in FIG. 9 with part of its body broken away to exhibit the spring support.

FIGS. 9 and 10 show an embodiment of the decoy spring-rod mounting unit where the helical spring 13 is totally concealed within the decoy shell of a turkey decoy in which case most of the tilting or bending occurs in the helical spring 13. A washer 60 and the spherical bead 21 serve as a thrust bearing as in the FIGS. 1 and 4 embodiments. The turkey is supported on a tubular element 61 which fits over rod 11. A washer 62 is interposed between the sleeve and the back of the turkey. A wing nut 18 is turned on to the upper threaded end of rod 11 to retain the turkey on the rod but still permits the turkey to rotate and to tilt when the breeze against the turkey causes spring 13 to bend laterally. The belly of the turkey has a rather large hole 63 in which there could be a grommet, not shown, that provides freedom for the rod to yield in all lateral directions in a strong wind.

Although applications of the new decoy mounting unit have been described in detail, such description is intended to be illustrative, rather than limiting, for the invention may be variously embodied and is to be limited only by interpretation of the claims which follow.

I claim:

1. An animated decoy comprising:

a body having a top and a bottom, an elongated flexible rod member for passing through the top of the body, the body and the bottom of the body to provide for supporting the body on the rod member so that when the body is subjected to a breeze the rod flexes, the body tilts and restores to untilted position repeatedly, fastening means for securing said body on said flexible rod member, and a bearing means supported on the rod beneath the bottom of the body for prohibiting said body from sliding down on the rod member and supporting said decoy for turning about the axis of the rod member wherein said bearing means is comprised of an element having a curved bearing surface.

2. The decoy according to claim 1 wherein said bearing means is comprised of an element that has a spherical surface.

3. A decoy according to claim 1, wherein a portion of said flexible rod member is formed as a helical spring continuous with the rod member.

4. A decoy according to claim 3 wherein said flexible rod member is composed of spring metal.

5. A decoy according to claim 4 wherein the helical spring is positioned beneath said bottom of the body.

6. A decoy according to claim 3 wherein a straight portion of the rod extends from a convolution of the spring for said passing through said body, and a mounting member to which said spring is fastened to so that the decoy stands upright on the mounting member.

7. A decoy according to claim 6 wherein the mounting member is selected from one of a plate and a clamp.

8. A decoy according to claim 1 wherein said flexible rod member has a portion shaped as a helical spring and a straight portion of the rod member extending nominally upwardly from a convolution of the spring and it is said straight portion that passes through said body of the decoy and another straight portion of the rod member extends nominally downwardly from a convolution of the spring, said bearing means comprises a bearing element having a bore for fitting on said upwardly extending portion of said rod member and having said curved bearing surface on which the decoy is journaled for rotation.

9. A decoy according to claim 8 wherein said bearing element is spherical.

10. A decoy according to claim 1, wherein said rod passing through said body passes substantially through the center of gravity of the body.

11. A decoy animated by a breeze comprising:

a hollow body having a top surface and a bottom surface, a flexible rod member having opposite end portions and a portion of the rod member between the end portions having been formed as a helical spring with a straight portion of the rod member extending in one direction from a convolution of said spring through said bottom surface, the body and the top surface, fastening means for securing said body on said flexible rod member, a bearing element having a bore and fitted on said straight portion of the rod member between said bottom surface of the body and said spring, the bearing element having a curved bearing surface presented toward said bottom surface and a bearing member having a bearing surface bearing on the bearing element to support the body for turning about the axis of the rod member, said helical spring allowing said body to tilt and be restored to an untilted position alternately and repeatedly when the body is exposed to a breeze.

12. A decoy according to claim 11 wherein said bearing member is a washer on said straight portion of the rod.

13. A decoy according to any one of claims 11 or 12 wherein said curved surface of the bearing element is a spherical surface.

14. A decoy according to claim 11 wherein said bearing element is a spherical element.

15. A decoy according to claim 11 including a second straight portion of said rod extending from a convolution of the helical spring in a direction opposite of said one direction for the second straight portion to be inserted into the ground to support the decoy.

16. A decoy according to claim 11 including a mounting member on which said spring is fastened.

* * * * *